US012680628B2

(12) United States Patent
Sträng et al.

(10) Patent No.: US 12,680,628 B2
(45) Date of Patent: Jul. 14, 2026

(54) GUARD SENSOR DEVICE FOR USE WITH A CABLE, PIPE OR WIRE TRANSIT, AND A METHOD OF GUARDING A CABLE, PIPE OR WIRE TRANSIT

(71) Applicant: Roxtec AB, Karlskrona (SE)

(72) Inventors: Daniel Sträng, Karlskrona (SE); Tony Törnström, Karlskrona (SE)

(73) Assignee: Roxtec AB, Karlskrona (SE)

( * ) Notice: Subject to any disclaimer, the term of this patent is extended or adjusted under 35 U.S.C. 154(b) by 427 days.

(21) Appl. No.: 18/029,867

(22) PCT Filed: Sep. 21, 2021

(86) PCT No.: PCT/SE2021/050907
§ 371 (c)(1),
(2) Date: Mar. 31, 2023

(87) PCT Pub. No.: WO2022/071843
PCT Pub. Date: Apr. 7, 2022

(65) Prior Publication Data
US 2023/0358344 A1 Nov. 9, 2023

(30) Foreign Application Priority Data

Oct. 2, 2020 (SE) .................................... 2051158-0

(51) Int. Cl.
*F16L 5/08* (2006.01)
*H02G 3/22* (2006.01)
(52) U.S. Cl.
CPC .................. *F16L 5/08* (2013.01); *H02G 3/22* (2013.01); *F16L 2201/10* (2013.01); *F16L 2201/30* (2013.01)
(58) Field of Classification Search
CPC ..... F16L 5/08; F16L 2201/10; F16L 2201/30; H02G 3/22
See application file for complete search history.

(56) References Cited

U.S. PATENT DOCUMENTS 4,235,674 A 11/1980 Yue
5,416,271 A 5/1995 Birmingham et al.
(Continued)

FOREIGN PATENT DOCUMENTS

CN 110504560 A 11/2019
DE 4413817 A1 10/1995
(Continued)

OTHER PUBLICATIONS

PCT International Search Report for PCT Application No. PCT/SE2021/050907 mailed Sep. 29, 2021 (5 pages).
(Continued)

*Primary Examiner* — Gilbert Y Lee
(74) *Attorney, Agent, or Firm* — Merchant & Gould P.C.

(57) ABSTRACT

A guard sensor device (100) is disclosed for use with a cable, pipe or wire transit (1) of a type that has one or more compressible transit elements (20) for allowing a sealed installation of one or more cables (2), pipes or wires, the sealed installation requiring appropriate mounting and tightening of one or more tightening members (41). The guard sensor device (100) comprises a base part (110; 210) and a cover part (120). The cover part is mountable onto the base part by means of a mechanical connection (114*a-b*, 124*a-b*), such as a snap lock connection, thereby forming between them an internal cavity (116*a-b*, 126*a-b*) for housing a protruding part of one (41*a*) of the tightening members (41) when being appropriately mounted and tightened. The guard sensor device (100) further comprises a sensor (130) disposed in either of the base and cover parts (110, 120). The sensor (130) is adapted to detect removal of the cover part (120) with respect to the base part (110) and in response generate an alert signal (S) to indicate that the sealed condition of the installation has possibly been compromised.

19 Claims, 8 Drawing Sheets

(56)  References Cited

U.S. PATENT DOCUMENTS

| | | | |
|---|---|---|---|
| 10,082,450 | B2 | 9/2018 | Ackerman et al. |
| 12,098,795 | B2 | 9/2024 | Persson |
| 2002/0096218 | A1* | 7/2002 | Mefford ................. F16J 15/004 137/557 |
| 2013/0064622 | A1 | 3/2013 | Mekid et al. |

FOREIGN PATENT DOCUMENTS

| | | |
|---|---|---|
| DE | 19602760 A1 | 7/1997 |
| JP | 2000-002441 A | 1/2000 |
| JP | 2012-213572 A | 11/2012 |
| JP | 2015-219081 A | 12/2015 |
| JP | 2019-090496 A | 6/2019 |
| JP | 2020-528539 A | 9/2020 |
| WO | 9305490 A1 | 3/1993 |
| WO | 2007097706 A1 | 8/2007 |
| WO | 2008010755 A1 | 1/2008 |
| WO | 2018208215 A1 | 11/2018 |

OTHER PUBLICATIONS

PCT Written Opinion for PCT Application No. PCT/SE2021/050907 mailed Sep. 29, 2021 (4 pages).
Swedish Search Report for Application No. 2051158-0 dated Jun. 1, 2021 (2 pages).

* cited by examiner

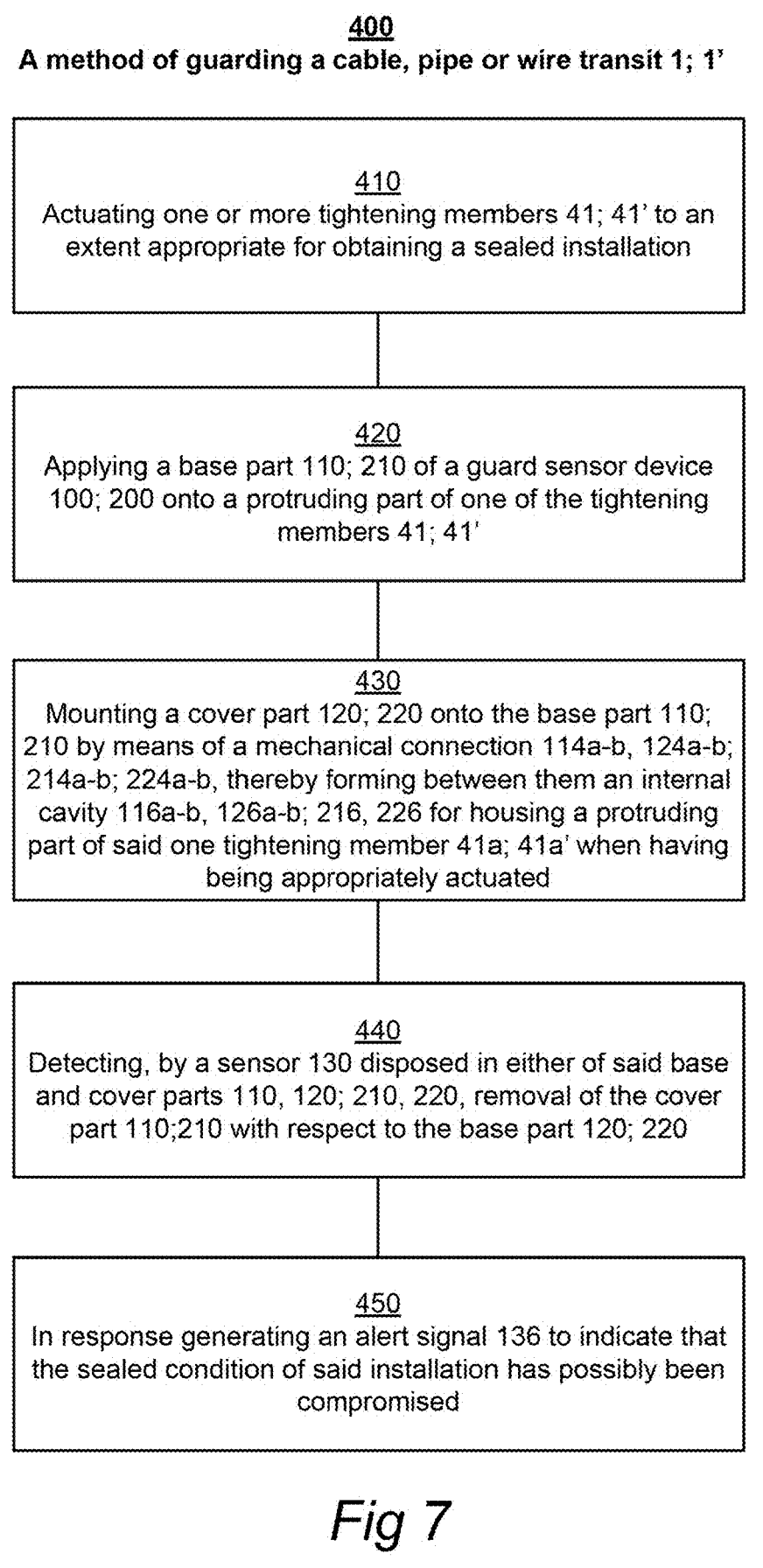

400
A method of guarding a cable, pipe or wire transit 1; 1'

410
Actuating one or more tightening members 41; 41' to an extent appropriate for obtaining a sealed installation

420
Applying a base part 110; 210 of a guard sensor device 100; 200 onto a protruding part of one of the tightening members 41; 41'

430
Mounting a cover part 120; 220 onto the base part 110; 210 by means of a mechanical connection 114a-b, 124a-b; 214a-b; 224a-b, thereby forming between them an internal cavity 116a-b, 126a-b; 216, 226 for housing a protruding part of said one tightening member 41a; 41a' when having being appropriately actuated

440
Detecting, by a sensor 130 disposed in either of said base and cover parts 110, 120; 210, 220, removal of the cover part 110;210 with respect to the base part 120; 220

450
In response generating an alert signal 136 to indicate that the sealed condition of said installation has possibly been compromised

*Fig 7*

GUARD SENSOR DEVICE FOR USE WITH A CABLE, PIPE OR WIRE TRANSIT, AND A METHOD OF GUARDING A CABLE, PIPE OR WIRE TRANSIT

This application is a National Stage Application of PCT/SE2021/050907, filed 21 Sep. 2021, which claims benefit of Serial No. 2051158-0, filed 2 Oct. 2020 in Sweden, and which applications are hereby incorporated by reference in their entireties. To the extent appropriate, a claim of priority is made to each of the above disclosed applications.

TECHNICAL FIELD

The present invention generally relates to the field of sealed installations of cables, pipes or wires, and more particularly to a guard sensor device for use with a cable, pipe or wire transit of a type that has one or more transit elements for allowing a sealed installation of one or more cables, pipes or wires, said sealed installation requiring appropriate mounting and tightening of one or more tightening members. The present invention also relates to an associated method of guarding a cable, pipe or wire transit of the aforementioned type.

BACKGROUND

Sealed installations of cables, pipes or wires are commonly used in many different environments, such as for cabinets, technical shelters, junction boxes and machines. They are used in a variety of different industries, such as automotive, telecom, power generation and distribution, as well as marine and offshore. The sealed installations serve to seal effectively against fluid, gas, fire, rodents, termites, dust, moisture, etc., and may involve cables for electricity, communication, computers, etc., pipes for different gases or liquids such as water, compressed air, hydraulic fluid and cooking gas, and wires for load retention.

The present applicant is a global leader in the development of cable, pipe or wires transits for sealing purposes. A transit, which may also be referred to as a lead-through, is made up of one or more transit elements which upon installation at a site are assembled into a sealed installation of one or more cables, pipes or wires. One commonly used transit type has an essentially rectangular frame, inside of which a number of modules are arranged to receive cables, pipes or wires. The modules are made of an elastic material, such as rubber or plastics, and are thus compressible and moreover adaptable to different outer diameters of the cables, pipes or wires. The modules are typically arranged side by side in one or more rows together with a compression unit. The compression unit is placed between the frame and the modules in such a way that when the compression unit is expanded by actuating a set of tightening members (such as screws or bolts), the compressible modules will be compressed around the cables, wires or pipes. Hence, for the installation to be properly sealed, it is required that the tightening members are appropriately mounted and tightened.

For ease of description, the term "cable" will be mainly used in this document, but it should be construed broadly and a person skilled in the art will realise that it normally also covers pipes or wires, or is an equivalent thereof.

Another type of transit has an essentially cylindrical form and is to be received in a sleeve, also known as a pipe sleeve, in a wall or an opening in a wall. To function in the desired way, the transit is adapted to fit snugly into the sleeve or the opening of the wall in which it is received, and the transit is adaptable to the actual mounting dimension. The mounting dimension is dictated by the inner diameter of the sleeve or the opening. The transit has a cylindrical compressible body, which is compressed axially between fittings at the opposite ends of the compressible body by actuating a set of tightening members to an appropriate extent (a certain tightening torque) in order to obtain a sealed installation. By the axial compression, the cylindrical body will expand radially both inwards and outwards. Furthermore, the cables received may have different outer diameters, and, thus, the module is adaptable to cables having different outer diameters.

In some designs, a combined frame and compressible module may constitute the only, single transit element of the transit and therefore in effect constitute the transit as such. Other types of transits are also known in the technical field, as the skilled person is well aware of per se.

As the skilled reader will note, the sealing status of the transit installation will be dependent on appropriate mounting and sufficient tightening of the tightening members of the transit, and this becomes an important fact to keep an eye on.

WO 2007/097706 discloses one prior art approach in this regard. The document presents a compression indicator clip shaped and designed to fit on the stems of a pair of screws (i.e., tightening members) of a compression unit (a.k.a. wedge) in a transit of the aforementioned first type, i.e. having a rectangular frame for containing a plurality of transit elements that include a number of compressible modules. The compression indicator clip has an elongated shape with two rounded ends, the length of the clip matching the distance between the screws of the compression unit. In a transit of this type, as the screw are being tightened, the distance between the head of each screw and the front surface of the compression unit will increase. Appropriate tightening of the screws will thus mean that they will protrude at a certain given distance A from the compression unit, and the width of the compression indicator clip (more specifically, the width of the two rounded ends thereof) corresponds to this given distance A. The compression clip will therefore fit on the screws of the compression unit when the screws have been tightened to the given protruding distance A. Accordingly, a successfully applied compression indicator clip on the screws of the compression unit will thus serve as a verification of the screws being correctly tightened and, ultimately, as a visual indication of a properly sealed condition of the transit installation.

Some drawbacks can be seen from the fact that the compression indicator clip in WO 2007/097706 is a purely mechanical device, hence only being capable of conveying a purely visual indication of the sealed condition of the transit installation. The eyes of a human inspector person will be needed in order to make use of the information inherently conveyed by the compression indicator clip. The inspector person will have to make an ocular investigation of the mounting of the compression indicator clip onto the screws of the compression unit and ask himself or herself whether or not the compression indicator clip is really properly positioned on these screws. This means firstly that the inspector person must inevitably appear in person very close to the transit in order to inspect the compression indicator clip and learn about the sealed status of the transit installation. Also, there is a certain risk that the inspector person will not notice a slight misalignment in the fitting of the compression indicator clip on the screws.

WO 2018/208215 presents another approach for keeping track of the sealing status of a transit installation. A transit guard unit is provided at the transit and is configured to detect a condition indicative of a sealed or at least potentially not sealed transit installation. The transit guard unit transmits information about the detected condition via a communication interface to a communication network or via a short-range wireless communication interface to a mobile device. A central monitoring unit receives the information about the detected condition, registers the information and makes it available for a user. The user may be remote from the actual transit and still enjoy the benefit of being updated on the status of the transit. Status information may be communicated back from the central monitoring unit to the transit guard unit, which may present the status information locally at the transit by means of a set of LED indicators, a multi-color LED indicator or a display screen of the status indicator unit that may be integrated with the transit guard unit or arranged as a separate device next to the transit.

The approach taken in WO 2018/208215 has several advantages. It represents a digital system-oriented solution to the problem of monitoring the status of a transit installation. The solution is inherently scalable since the central monitoring unit can be in operative communication with a plurality of transit guard units placed at a plurality of respective transits. It thus allows remote and centralized monitoring of a large number of transits.

Still, there are some drawbacks of this approach. The transit guard unit will need a certain physical design in order for it to be used with a given kind of transit. For the aforementioned type of transit that has a compression unit (wedge) actuated by one or more tightening members (e.g. screws), the transit guard unit as a whole is specifically designed with an apparatus housing adapted for mounting onto the compression unit, with respective recesses at the underside of the apparatus housing for engagement with the tightening members. This can be seen in FIGS. 4a-4B and 5A-5D in WO 2018/208215. A sensor is located at one of the recesses and is adapted for detecting whether the transit guard unit is in place on the compression unit or is removed from it.

One shortcoming of this is that there will have to be space enough in front of the transit to allow mounting of the somewhat bulky transit guard unit onto the compression unit of the transit. This may be challenging in tight installation spaces or when the transit shall accommodate many thick cables.

A related shortcoming is that upon installation of the transit guard unit, the person installing the unit will have to place the whole unit correctly onto the tightening members of the compression unit. Since the recesses are provided at the underside of the transit guard unit, the apparatus housing of the unit might in effect obscure the sight of the person installing the unit. He or she will be given no direct feedback of a correct mounting of the transit guard unit onto the compression unit of the transit.

Another potential shortcoming is that the transit guard unit will protrude from the front surface of the transit and thus be susceptible of collision by people passing near the transit. Should this happen, the position of the transit guard unit may be inadvertently moved such that the sensor is triggered and a false detection result is communicated to the central monitoring unit.

Yet another shortcoming is that a transit guard unit designed in this way can only be used with transits having a compression unit of this particular type. The entire apparatus housing of the transit guard unit will have to be redesigned if it is to be used with other types of transits having different compression units. The problem is even more apparent if it is desired to use the transit guard unit with transit types that do not even have a compression unit of this kind but rather involve other means for or ways of obtaining a sealed installation. This may require the operator of the monitoring system to provide many different transit guard units, customized to different kinds of transits.

SUMMARY

It is accordingly an object of the invention to provide one or more improvements when it comes to the monitoring, or guarding, of a cable, pipe or wire transit of a type that has one or more compressible transit elements for allowing a sealed installation of one or more cables, pipes or wires, said sealed installation requiring appropriate mounting and tightening of one or more tightening members.

One aspect of the present invention is a guard sensor device for use with a cable, pipe or wire transit of a type that has one or more compressible transit elements for allowing a sealed installation of one or more cables, pipes or wires, said sealed installation requiring appropriate mounting and tightening of one or more tightening members. The guard sensor device comprises a base part and a cover part. The cover part is mountable onto the base part by means of a mechanical connection. The cover part and the base part thereby form between them an internal cavity. The internal cavity is suitable for housing a protruding part of one of said tightening members when having been appropriately mounted and tightened. The guard sensor device further comprises a sensor disposed in either of said base and cover parts, and being adapted to detect removal of the cover part with respect to the base part and in response generate an alert signal to indicate that the sealed condition of said installation has possibly been compromised.

Advantageously, the mechanical connection is a snap lock connection for engaging the cover part with the base part. Using a mechanical connection in the form of a snap lock connection is beneficial for several reasons. Firstly, it facilitates mounting of the cover part onto the base part without any use of separate tools. Secondly, it securely engages these two parts. Thirdly, a click sound may be generated when the two parts engage, and such a click sound may serve as an audible and possibly tactile feedback to the person installing the guard sensor device that the guard sensor device has been successfully installed on the transit. Fourthly, it allows convenient removal of the cover part from the base part, again without any use of separate tools, in situations when such removal is desired, for instance when an action of maintenance of the transit is necessary.

The guard sensor device may further comprise means for communicating the alert signal to a guard host device. In one or more embodiments, the means for communicating the alert signal to the guard host device comprises a signal cable being mechanically coupled at one end to the base part and being operatively connected to said sensor, and a cable connector at another end of the signal cable for connecting the signal cable to the guard host device. Alternatively, the means for communicating the alert signal to the guard host device may comprise a wireless communication interface.

In one or more embodiments, the guard sensor device further comprises an elongated stiff support member coupled at one end to the base part and adapted to be coupled at another end to a housing of the guard host device.

Advantageously, the sensor is susceptive of a magnetic field and is provided in one of the base and cover parts, wherein the guard sensor device further comprises a magnetic element which is a source of the magnetic field and is provided in the other of the base and cover parts. Alternatively, the sensor may, for instance, be selected from the group consisting of: a pressure sensor, a piezoelectric sensor, an electric switch, and a photo sensor.

The tightening members may typically be selected from the group consisting of: screws, bolts, pin bolts, and nuts.

Advantageously, the snap lock connection is formed by a pair of resilient locking tongues on one of the cover part and base part, and by a pair of corresponding engagement structures in the other of the base part and cover part. The corresponding engagement structures are adapted for engaging with the resilient locking tongues when the cover part is mounted onto the base part, with the protruding part of said one tightening member being received in the internal cavity formed between the base part and the cover part.

In one or more embodiments, the internal cavity is formed by one or more recesses in the base part and one or more recesses in the cover part. Each of the base part and cover part may comprise a first recess and a second recess for forming the internal cavity, the first recesses being shaped and dimensioned for receiving a first part of the protruding part of said one tightening member, and the second recesses being shaped and dimensioned for receiving a second part of the protruding part of said one tightening member. When said one tightening member is a screw or a bolt with a nut, the first recesses are beneficially shaped and dimensioned for receiving a freely exposed part of the stem of the screw or bolt, while the second recesses are shaped and dimensioned for receiving a head of the screw or the nut.

In alternative embodiments, each of the base part and cover part comprises a recess for forming the internal cavity, the recesses being shaped and dimensioned for receiving the protruding part of said one tightening member, and wherein each of the base part and cover part further comprises a respective lateral edge portion, the lateral edge portions together defining an opening that matches a groove in a spacer element disposed on a stem part of said one tightening member.

In some embodiments of the guard sensor device, the base part and the cover part are shaped and designed to be mounted onto a pair of tightening members of a compression unit in a transit that further has a rectangular frame for containing a plurality of compressible modules.

In alternative embodiments of the guard sensor device, the base part and the cover part are shaped and designed to be mounted onto one tightening members of a compression unit in a transit that further has a cylindrical compressible body being axially compressible by actuating a plurality of tightening members, said plurality of tightening members including said one tightening member.

Another aspect of the present invention is a method of guarding a cable, pipe or wire transit of a type that has one or more compressible transit elements for allowing a sealed installation of one or more cables, pipes or wires. The method comprises:

actuating one or more tightening members to an extent appropriate for obtaining said sealed installation;

applying a base part of a guard sensor device onto a protruding part of one of said one or more tightening members;

mounting a cover part onto the base part by means of a mechanical connection, thereby forming between them an internal cavity for housing the protruding part of said one tightening member when having being appropriately actuated;

detecting, by a sensor disposed in either of said base and cover parts, removal of the cover part with respect to the base part; and in response generating an alert signal to indicate that the sealed condition of said installation has possibly been compromised.

In beneficial embodiments of the method, the mechanical connection is a snap lock connection that engages the cover part with the base part.

The method may advantageously further comprise communicating the alert signal to a guard host device.

Still other aspects and features of the invention and its embodiments are defined by the appended patent claims and are further explained, together with problems solved and advantages obtained, in the detailed description section as well as in the drawings.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Objects, features and advantages of embodiments of the invention will appear from the following detailed description, reference being made to the accompanying drawings.

FIG. 7 is a flowchart diagram illustrating a method of guarding a cable, pipe or wire transit according to the present invention.

DETAILED DESCRIPTION

Figure 1:
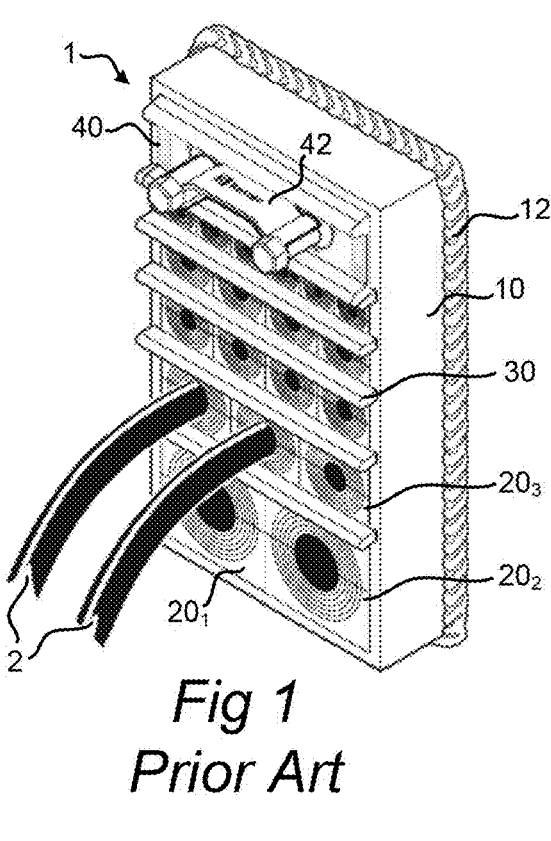
FIG. 1 is a schematic isometric view of a transit according to the prior art, comprising a plurality of transit elements which upon installation at a site have been assembled into a sealed installation of a plurality of cables.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

The detailed disclosure will begin by briefly describing a transit of the type which was referred to as the rectangular-frame type in the background section of this document. Such a transit 1, also known as a lead-through, is schematically illustrated in FIG. 1. The transit 1 comprises a plurality of different transit elements 10, 20, 30, 40, 42 which upon installation at a site have been assembled into a sealed installation of a plurality of cables 2. Generally, the transit elements which make up a transit may be of different types and may exist as a single instance or as multiple instances, depending on implementation.

As seen in FIG. 1, the transit 1 comprises a frame 10, inside of which a plurality of compressible modules are arranged in different sizes and numbers (only three of the compressible modules being indicated as 20₁, 20₂ and 20₃ in FIG. 1). The frame 10 of the transit 1 is mounted by means of a packing, sealing or weld joint 12.

Figure 2A:
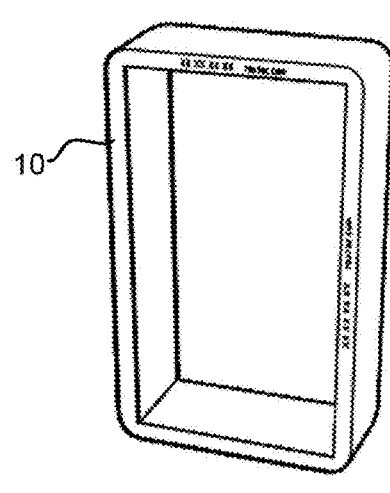
FIG. 2A is a schematic isometric view of a first type of transit element in the form of an essentially rectangular frame.
Figure 2B:
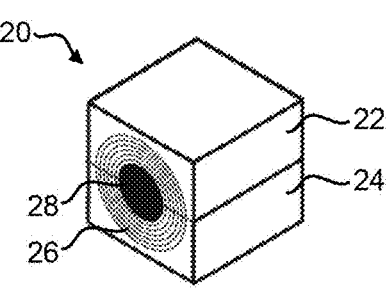
FIG. 2B is a schematic isometric view of a second type of transit element in the form of a compressible module according to the prior art.

A compressible module 20 is shown in FIG. 2B. The compressible module 20 has a box-shaped body which is divided into two halves 22, 24. A number of layers 26 of elastic material are concentrically arranged in the body 22, 24 around a center core 28. By removing the core 28 and peeling off a suitable number of layers 26 at installation, the compressible module 20 may be adapted to securely engage a cable 2 among cables of different diameters. In the example seen in FIG. 1, only two cables 2 are mounted in two respective modules 20; the remainder of the modules 20 in FIG. 1 are currently not used for cable lead-through and therefore still have the respective cores 28 in place.

As is clear from FIG. 1, a (main) transit element type (such as a compressible module 20) may in turn appear in different (sub) types, for instance differentiated by size (see modules 20₂ and 20₃ in FIG. 1).

Figure 2C:
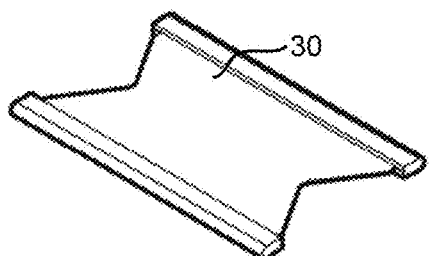
FIG. 2C is a schematic isometric view of a third type of transit element in the form of a stayplate according to the prior art.

FIG. 2C illustrates a third type of transit element in the form of a stayplate 30 which, as is seen in FIG. 1, is used to separate different rows of compressible modules 20 in the frame 10.

Figure 2D:
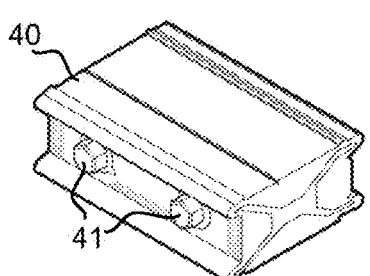
FIG. 2D is a schematic isometric view of a fourth type of transit element in the form of a wedge or compression unit according to the prior art.

FIG. 2D illustrates a fourth type of transit element in the form of a compression unit (wedge) 40. The compression unit 40 is placed between the frame 10 and the modules 20 in such a way that when the compression unit is expanded, the compressible modules will be compressed around the cables 2 such that a sealed installation is achieved.

It is to be noticed that different transits may vary considerably in size and complexity, depending on the nature and implementation requirements at the installation site in question.

Figure 2E:
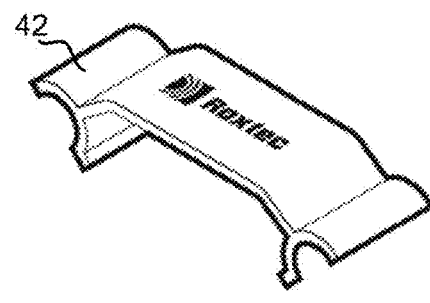
FIG. 2E is a schematic isometric view of a fifth type of transit element in the form of a compression indicator clip according to the prior art.

As was identified in the background section of this document, there is a general need for monitoring, or guarding, of a transit in operation at a site, and more specifically the sealing status of the transit installation. FIG. 2E illustrates one of the prior art approaches that was referred to in the background section of this document, involving a fifth type of transit element in the form of a compression indicator clip (wedge clip) 42. When the compression unit 40 has been sufficiently expanded, the tightening members (e.g. bolts or screws) 41 will protrude far enough for the compression indicator clip 42 to be attached onto them. (It is to be noted that FIG. 2D illustrates the compression unit 40 in a non-expanded state with the tightening members 41 still in a retracted position.) It is recalled that when the compression indicator clip 42 is successfully attached to the protruding tightening members 41, this will serve as a visual indication that the compression unit 40 has been sufficiently expanded and, ultimately, that the transit installation can be assumed to be sealed. The compression indicator clip 42 may additionally serve to prevent accidental loosening (de-expansion) of the compression unit 40.

A guard sensor device 100 according to a first embodiment of the present invention will now be described with reference to FIGS. 3A-4D. The guard sensor device 100 represents an improved solution to the problem of monitoring, or guarding, the sealing status of a transit installation. The guard sensor device 100 of the first embodiment can be used with any transit, the sealed condition of which requires the actuation of tightening members 41 such that they protrude to a certain extent from a surface of the transit.

Therefore, the guard sensor device 100 can, for instance, be used with a rectangular-frame type of transit 1, much like the transit 1 shown and described with reference to the preceding drawings. This can be seen in FIGS. 3A and 3B. When the tightening members 41 of the compression unit 40 in the transit 1 have been actuated (tightened) to an extent sufficient to compress the compressible modules 20, the guard sensor device 100 may be mounted onto them. This can be seen in FIGS. 3B-3C and will appear more clearly from FIGS. 4A-4D. As is seen in FIG. 3C, the guard sensor device 100 may be in operative communication with a guard host device 50.

Figure 4A:
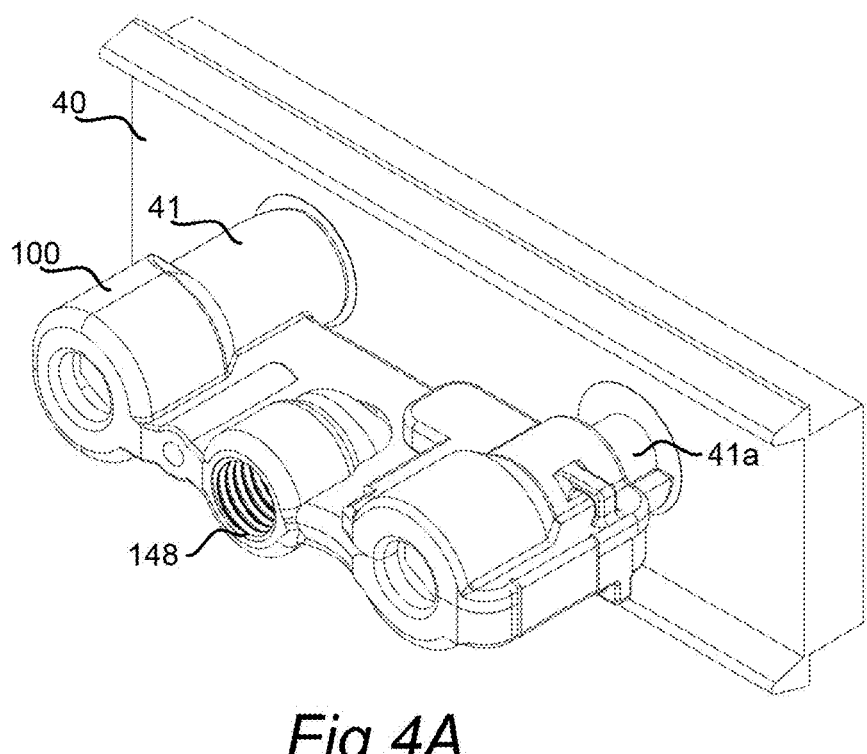
FIGS. 4A and 4B illustrate the guard sensor device according to the first embodiment in more detail.
Figure 4B:
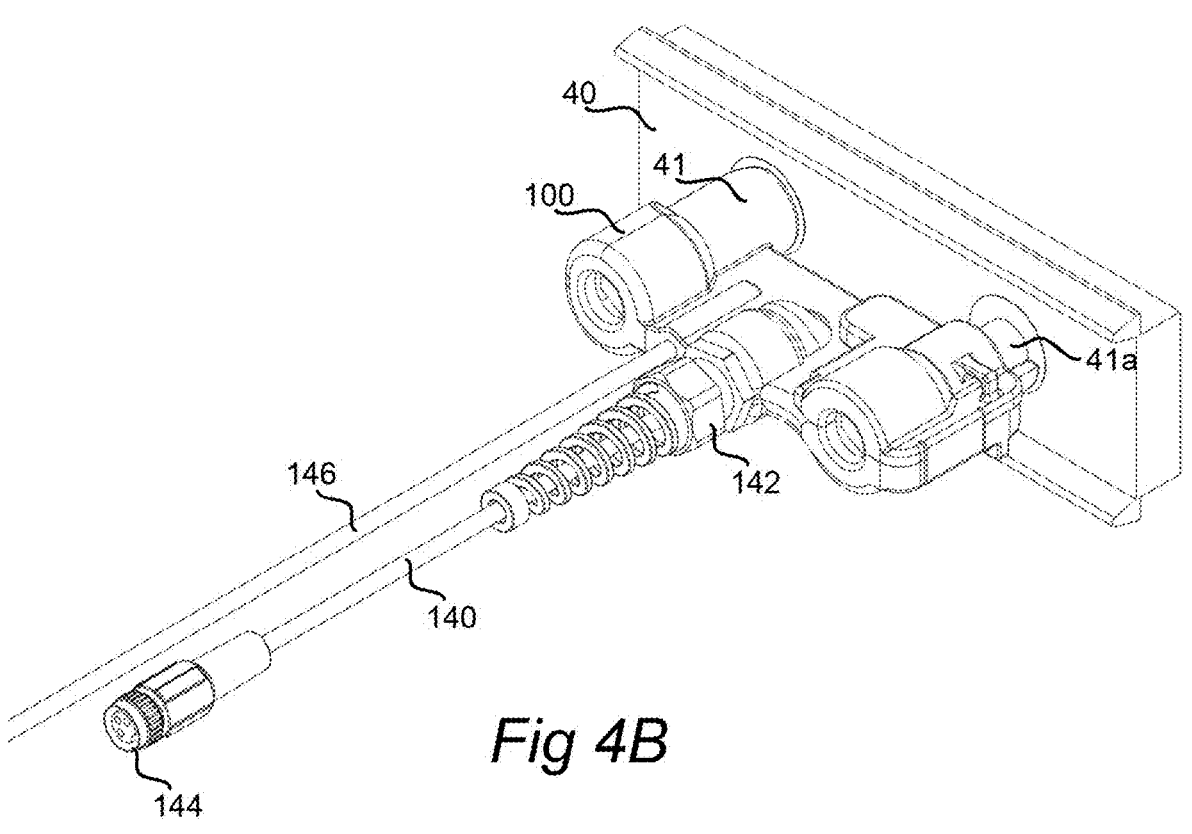
Figure 4C:
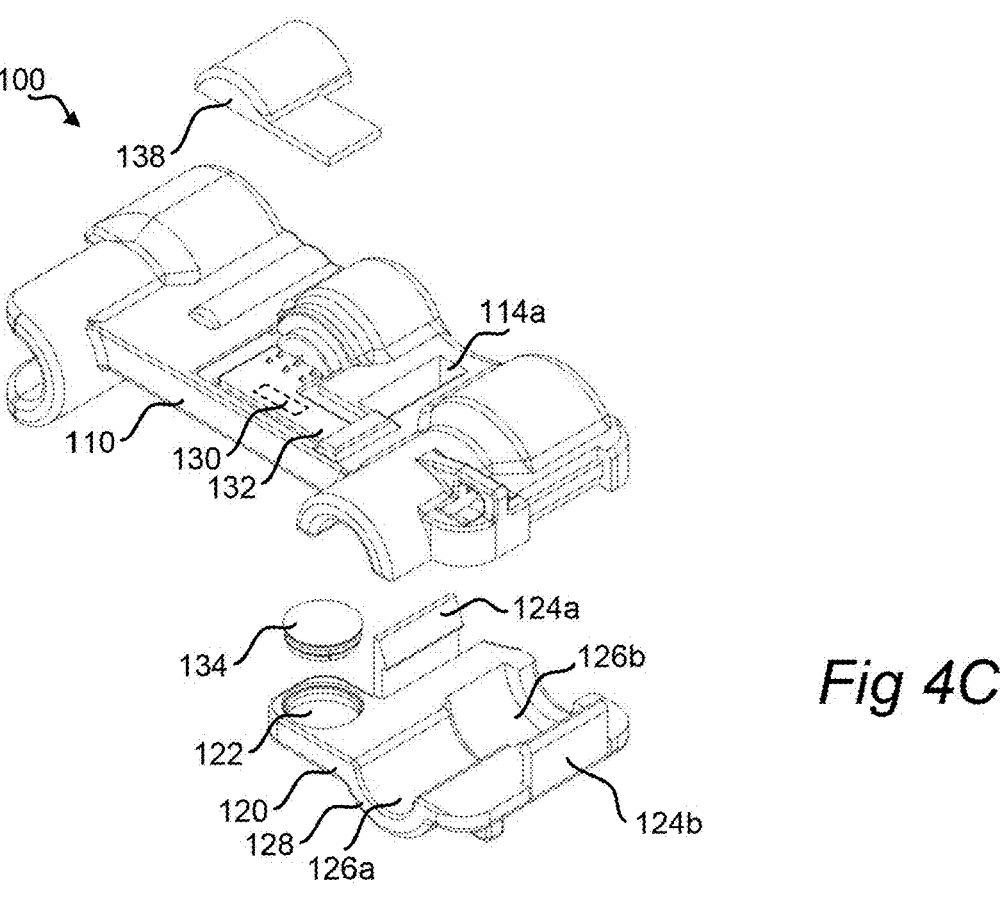
FIGS. 4C and 4D are exploded views of the guard sensor device according to the first embodiment.
Figure 4D:
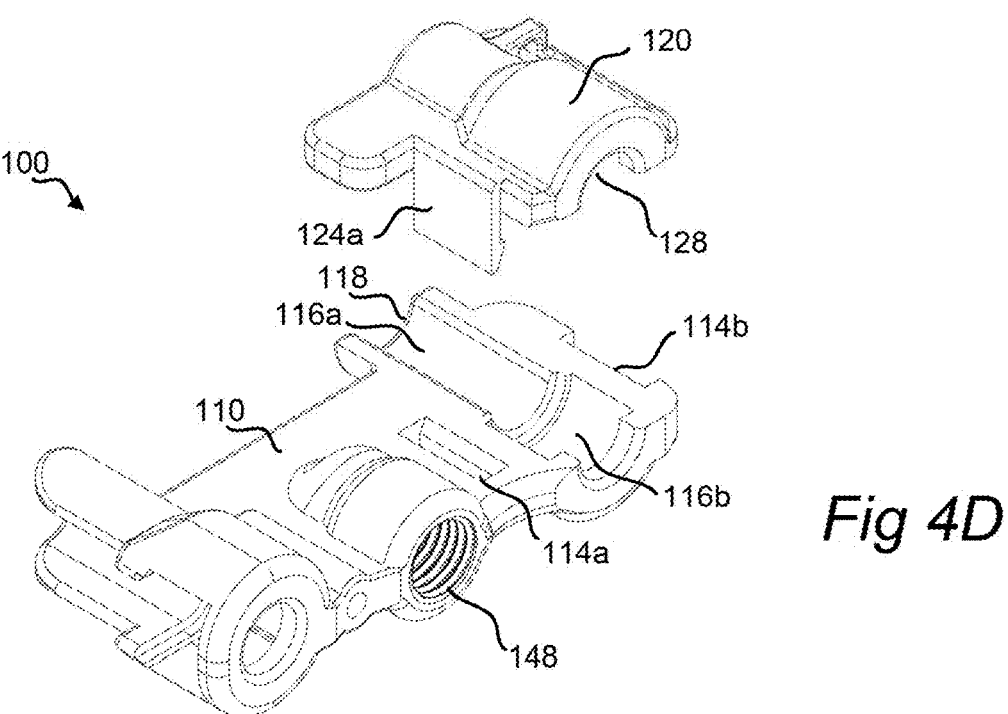

As can be seen particularly in FIGS. 4C-4D, the guard sensor device 100 has a housing which is divided into a base part 110 and a cover part 120. The housing members 110 and 120 may be made from a suitable material, such as a plastic material, without limitation. The cover part 120 is mountable onto the base part 110 by means of a mechanical connection 114a-b, 124a-b. In the disclosed embodiment, the mechanical connection is a snap lock connection, but in alternative embodiments it may be implemented by other means to achieve engagement between the cover part and the base part. Such other means may for instance involve surfaces on the cover part and the base part that give rise to frictional engagement between the cover part and base part, or fastening members like a screw to be received in a nut or a thread, etc.

However, a snap lock connection is considered particularly beneficial for several reasons. It facilitates mounting of the cover part 120 onto the base part 110 without any use of separate tools. Moreover, it securely engages these two parts. Also, a click sound may be generated when the two parts engage. Such a click sound may serve as an audible and possibly tactile feedback to the person installing the guard sensor device that the guard sensor device has been successfully installed on the transit. In addition, it allows convenient removal of the cover part from the base part, again without any use of separate tools, in situations when such removal is desired, for instance when an action of maintenance of the transit is necessary.

In the disclosed embodiment, the snap lock connection is more specifically formed by a pair of resilient locking tongues 124a, 124b on the cover part 120 which engage with corresponding engagement structures 114a, 114b in the base part 110. In other embodiments, the resilient locking tongues may be provided on the base part while the corresponding engagement structures are formed in the cover part.

Figure 3A:
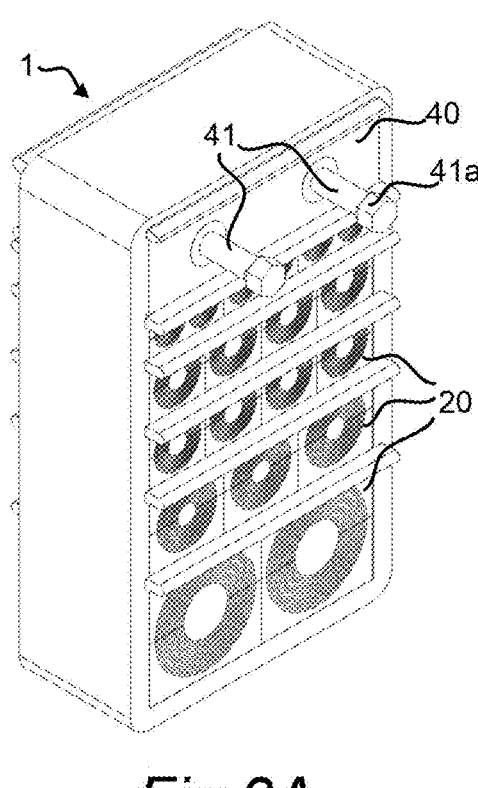
FIG. 3A is a schematic isometric view of a transit of generally the same type as in FIG. 1, having a pair of tightening members onto which a guard sensor device according to a first embodiment of the present invention may be mounted.
Figure 3B:
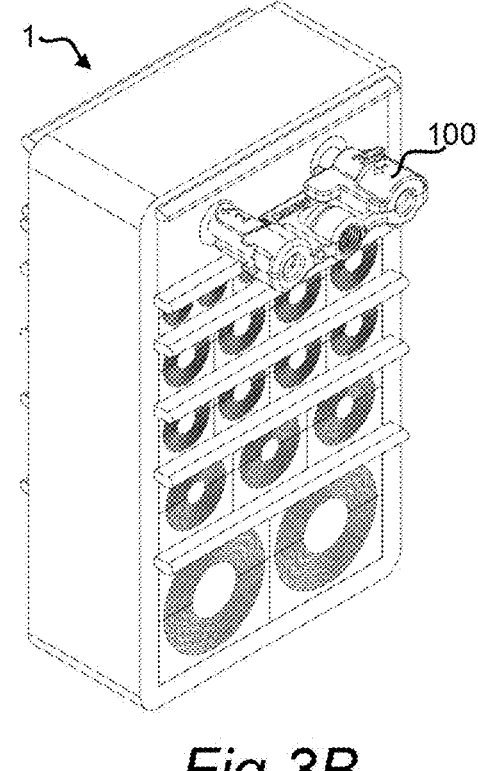
FIG. 3B is a schematic isometric view of the transit generally as seen in FIG. 3A, showing also a guard sensor device according to the first embodiment mounted to the tightening members.
Figure 3C:
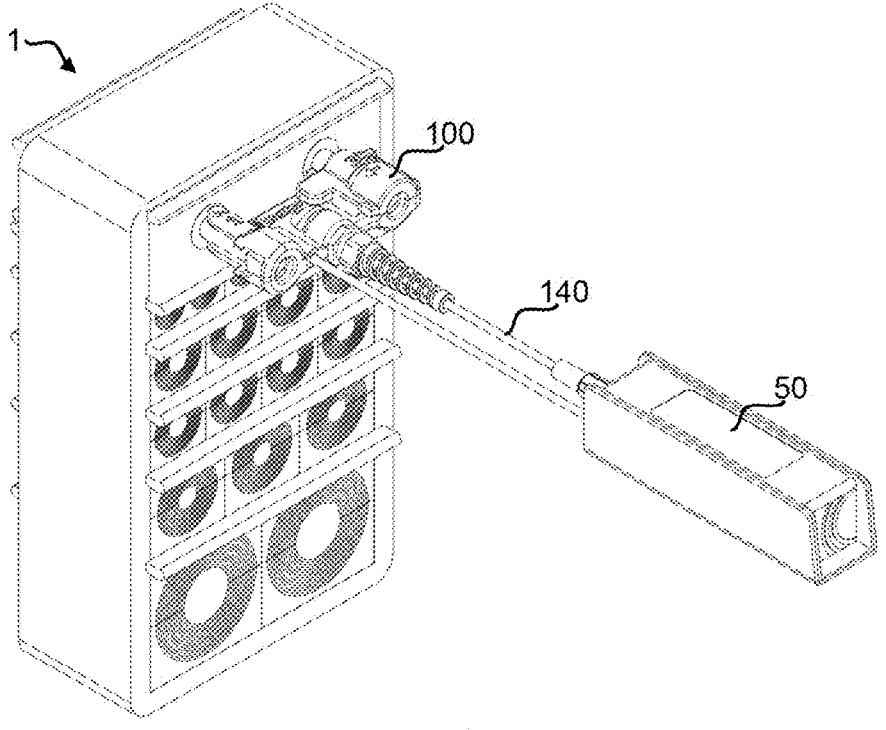
FIG. 3C is a schematic isometric view of the transit and the guard sensor device generally as seen in FIG. 3B, showing also a guard host device in operative communication with the guard sensor device.

When the cover part 120 has been mounted onto the base part 110, these parts will form between them an internal cavity 116a-b, 126a-b for housing a protruding part of one tightening member 41a among the tightening members 41 of the compression unit 40 of the transit 1 (also see FIGS. 3A and 3B). As can be seen in FIGS. 4C and 4D, the internal cavity 116a-b, 126a-b is formed by recesses 116a and 116b in the base part 110 and by recesses 126a and 126b in the cover part 120.

Recesses 116a, 116b, 126a and 126b are shaped and dimensioned such that the internal cavity 116a-b, 126a-b formed by these recesses will rather snugly receive the protruding part of the aforesaid one tightening member 41a, provided that it has been appropriately mounted and tightened. The tightening member 41a may typically be a screw in the disclosed embodiment, and accordingly the recesses 116a and 126a are shaped and dimensioned to match a freely exposed part of the stem of the screw 41a, whereas the recesses 116b and 126b are shaped and dimensioned to match the head of the screw 41a.

Therefore, provided that the tightening members 41 (including the afore-mentioned tightening member 41a) have been appropriately mounted and tightened with respect to the compression unit 40 of the transit 1, the guard sensor device 100 can be conveniently installed on the transit 1 by mounting it onto the compression unit 40 of the transit 1 as follows:

i) Positioning the base part 110 such that the lower parts of the freely exposed part of the stem of the screw 41 and the head of the screw 41 are received in the recesses 116a and 116b.
  ii) Positioning the cover part 120 such that the upper parts of the freely exposed part of the stem of the screw 41 and the head of the screw 41 are received in the recesses 126a and 126b. The stem of the screw 41 is admitted to pass through an opening formed by lateral edge portions 118, 128 of the base and cover parts 110, 120.

iii) Applying a force onto the cover part 120 towards the base part 110 (for instance by pinching the cover part 120 and the base part 110 between the thumb and the index finger), wherein the locking tongues 124a, 124b will engage with the corresponding engagement structures 114a, 114b and the snap lock connection will be formed. When this happens, a click sound will be generated which, as previously mentioned, may serve as an audible and possibly tactile indication of a successful installation of the guard sensor device 100 on the transit 1.

The other tightening member 41 is correspondingly received and contained in recesses formed at the opposite end of the guard sensor device 100, as the skilled person will readily understand from the drawings.

As can be seen in FIG. 4C, a sensor 130 is disposed in the base part 110. The sensor 130 is adapted to detect removal of the cover part 120 from the base part 110 and in response generate an alert signal S (seen in FIG. 6) to indicate that the sealed condition of the transit installation has possibly been compromised. In other embodiments, the sensor may be disposed in the cover part 120. The sensor 130 may be a magnetic sensor, a pressure sensor, a piezoelectric sensor, an electric switch, a photo sensor, or generally any type of sensor capable of detecting removal of the cover part 120 from the base part 110. Here, it is worth noting that the design of the guard sensor device 100 with its snap lock connection has a benefit in that the guard sensor device 100 will be firmly engaged with the transit 1, thereby reducing the risk for the guard sensor device 100 and its sensor 130 inadvertently being pushed out of alignment with the tightening members as a result of accidental physical interference with a person or object passing close to the transit 1.

In the disclosed embodiment of FIG. 4C, the sensor 130 is a magnetic sensor susceptive of a magnetic field and is provided in the base part 110. The magnetic sensor 130 is provided on a circuit board 132 covered by a cap 138. In the disclosed embodiment, the guard sensor device 100 further comprises a magnetic element 134 which is a source of such a magnetic field and is provided in the cover part 120. The magnetic element 134 is received in a recess 122 in the cover part 120. In other embodiments, the magnetic sensor may be provided in the cover part 120 and the magnetic element in the base part 110. Such a magnetic sensor arrangement is believed to represent a robust solution particularly well suited for durable long-term operation.

In the disclosed embodiment, the guard sensor device 100 has a socket 148. See in particular FIGS. 4A and 4D. The purpose of the socket 148 is to allow connecting the guard sensor device 100 to a guard host device 50. As can be seen particularly in FIGS. 3C and 4B, the connection is achieved through a cable gland 142, a signal cable 140 and a cable connector 144. Elements 140, 142 and 144 constitute means for communicating the alert signal S, as generated by the sensor 130, to the guard host device 50. The signal cable 140 is mechanically coupled at one end 148 to the base part 110, and it is electrically connected to the circuit board 132 and is thereby operatively connected to the sensor 130. The sensor 130 may be power supplied by the guard host device 50 through the signal cable 140. The cable connector 144 at the other end of the signal cable 140 connects the signal cable 140 to the guard host device 50.

To facilitate installation of the guard host device 50 in front of the transit 1, an elongated stiff support member 146 may be provided which is coupled at one end to the base part 110 and at another end to the housing of the guard host device 50. This can be seen in FIGS. 3C and 4B.

In alternative embodiments, however, no stiff support member is provided; instead the guard host device 50 may for instance be placed at floor level near the transit 1, or on top of its rectangular frame 10. This may have a benefit in that the guard host device 50 is positioned more out of the way of a passing person or object.

In yet alternative embodiments, the means for communicating the alert signal S to the guard host device 50 may comprise a wireless communication interface rather than a cable-based. This will further facilitate a flexible location of the guard host device 50 relative to the transit 1. The sensor 130 and the wireless communication interface may then have to be power supplied by an internal power source, such as a battery, in the guard sensor device 100.

Figures 5A, 5B:
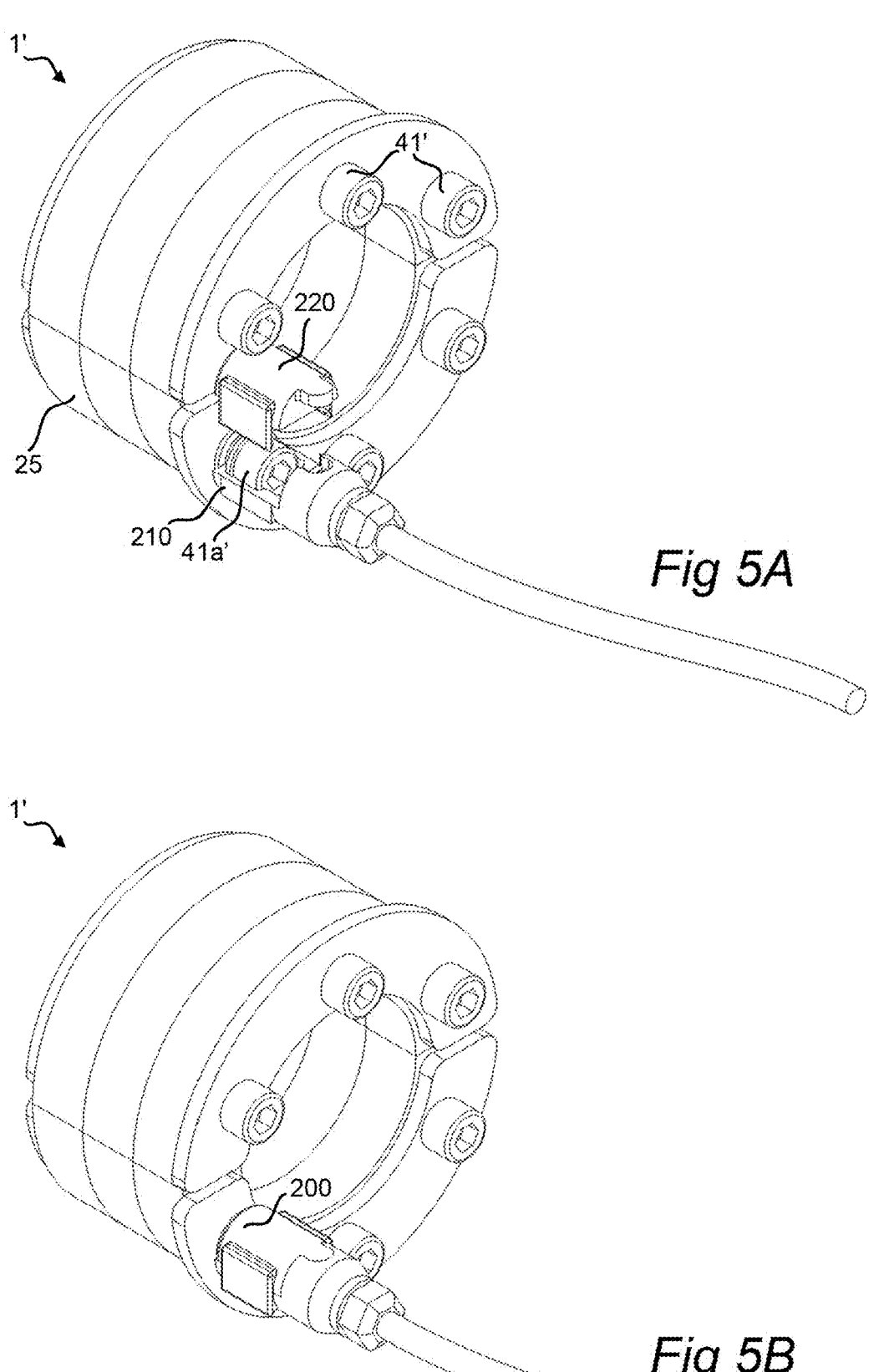
FIGS. 5A and 5B are schematic isometric views of a different type of transit, having a number of tightening members and with a guard sensor device according to a second embodiment of the present invention being mounted to one of these tightening members.
Figure 5C:
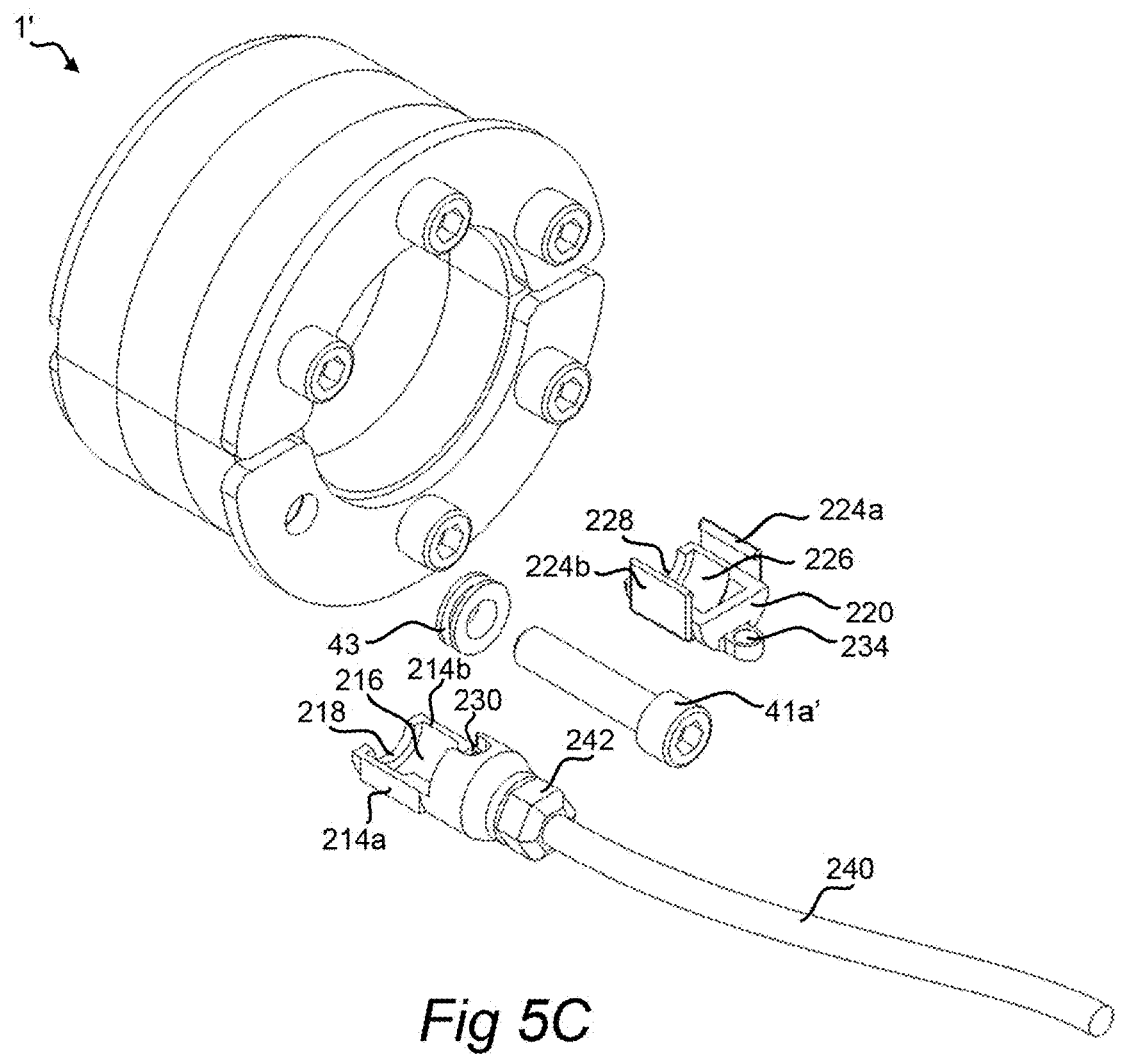
FIG. 5C is an exploded view of the guard sensor device according to the second embodiment.

A second embodiment 200 of the guard sensor device according to the present invention will now be described with reference to FIGS. 5A-5D. The second embodiment is particularly well suited for use with other kinds of transits than the rectangular-frame type. Hence, as can be seen in FIGS. 5A and 5B, the guard sensor device 200 is used with a transit 1' having an essentially cylindrical form. The transit 1' has a cylindrical compressible body 25, which is compressed axially between fittings at the opposite ends of the compressible body by actuating a plurality of tightening members 41' to an appropriate extent (i.e., a certain tightening torque) in order to obtain a sealed transit installation. By the axial compression, the cylindrical body 25 will expand radially both inwards and outwards, thereby sealing the transit 1' both outwardly towards an opening in a building structure (e.g. wall) through which it is arranged, and inwardly towards a cable running through the center of the cylindrical body 25.

Unlike the first embodiment, the extent of protrusion by the tightening members 41' of the transit 1' from the front surface of the transit 1' will not as such be indicative of appropriate mounting and tightening. Therefore, the housing design of the guard sensor device 200 in the second embodiment is in some regards different from the housing design of the guard sensor device 100 in the first embodiment.

Still, however, the guard sensor device 200 comprises a base part 210 and a cover part 220, wherein the cover part 220 is mountable onto the base part 210 by means of a mechanical connection in the form of a snap lock connection 214a-b; 224a-b, thereby forming between them an internal cavity 216, 226 for housing a protruding part of one of the tightening members 41' when being appropriately mounted and tightened. This one tightening member is indicated as 41a' in the second embodiment.

The snap lock connection is formed by a pair of resilient locking tongues 224a, 224b on one of the cover part 220 and base part 210—in the disclosed second embodiment: the cover part 220—and by a pair of corresponding engagement structures 214a, 214b in the other of the base part 210 and cover part 220—in the disclosed second embodiment: the base part 210. The corresponding engagement structures 214a, 214b are adapted for engaging with the resilient locking tongues 224a, 224b when the cover part 220 is mounted onto the base part 210 (again advantageously giving rise to a click sound), with the protruding part of said one tightening member 41a' being received in the internal cavity 216, 226 formed between the base part 210 and cover part 220.

Each of the base part 210 and cover part 220 comprises a recess 216 and 226, respectively, for forming the internal cavity. The recesses 216, 226 are shaped and dimensioned for receiving the protruding part of said one tightening member 41a'. Each of the base part 210 and cover part 220 further comprises a lateral edge portion 218 and 228, respectively, that together define an opening which matches a groove in a spacer element 43 disposed on a stem part of said one tightening member 41a'.

Similar to the first embodiment, a sensor 230 is disposed in the base part 210 (or, in alternative embodiments, in the cover part 220). The sensor 230 is adapted to detect removal of the cover part 220 with respect to the base part 210 and in response generate an alert signal S to indicate that the sealed condition of the transit installation has possibly been compromised. The sensor 230 can generally be like the sensor 130 as referred to above for the first embodiment. Hence, in the disclosed second embodiment, the sensor 230 is susceptive of a magnetic field, and the guard sensor device 200 further comprises a magnetic element 234 which is a source of such a magnetic field and is provided in the opposite one of the base and cover parts (i.e., in the cover part 220 in the disclosed second embodiment). Alternatively, the sensor 230 may be a pressure sensor, a piezoelectric sensor, an electric switch or a photo sensor, inter alia.

In further similarity with the first embodiment, the guard sensor device 200 comprises means for communicating the alert signal S, as generated by the sensor 230, to a guard host device 50. The means comprises a cable gland 242, a signal cable 240 and a cable connector (not seen in the drawings). The signal cable 240 is mechanically coupled at one end to the base part 210, and it electrically connected to a circuit board (not seen in the drawings) and is thereby operatively connected to the sensor 230 which is mounted on the circuit board. The sensor 230 may be power supplied by the guard host device 50 through the signal cable 240. The cable connector at the other end of the signal cable 240 connects the signal cable 240 to the guard host device 50.

In alternative embodiments, the means for communicating the alert signal S to the guard host device 50 may comprise a wireless communication interface rather than a cable-based. The sensor 230 and the wireless communication interface may then have to be power supplied by an internal power source, such as a battery, in the guard sensor device 200.

Figure 5D:
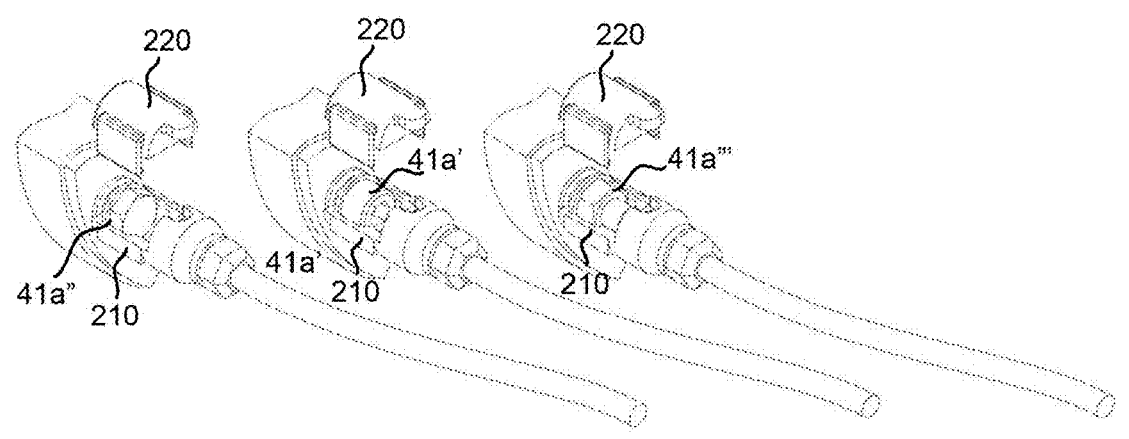
FIG. 5D illustrates the guard sensor device according to the second embodiment being mounted to different kinds of tightening members that may be used with the type of transit shown in FIGS. 5A and 5B.

FIG. 5D illustrates the guard sensor device 200 according to the second embodiment being mounted to different kinds of tightening members 41a' that may be used with the type of transit 1' shown in FIGS. 5A and 5B. To the left in FIG. 5D, the guard sensor device 200 is mounted to a tightening member 41a' in the form of a screw with a hexagonal head. In the middle of FIG. 5D, the guard sensor device 200 is mounted to a tightening member 41a' in the form of a screw with a cap head. To the right in FIG. 5D, the guard sensor device 200 is mounted to a tightening member 41a' in the form of a pin bolt with a nut.

Figure 6:
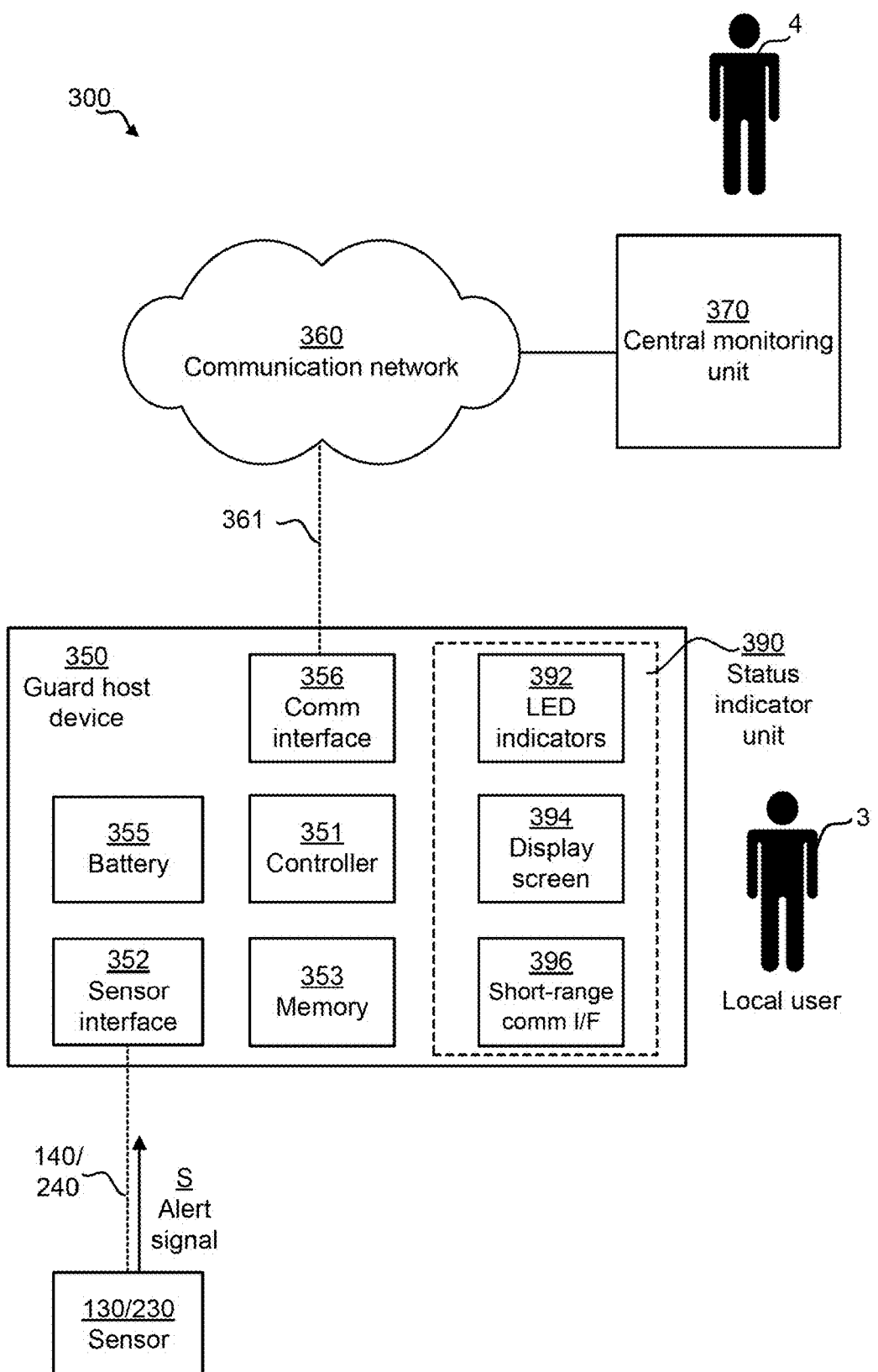
FIG. 6 is a schematic illustration of a monitoring system for cable, pipe or wire transits, in which the guard sensor device according to the present invention may be used.

FIG. 6 illustrates a monitoring system 300 for cable, pipe or wire transits, in which the guard sensor device 100; 200 according to the present invention may be used together with a guard host device 350. Note that only the sensor 130; 230 of the guard sensor device 100; 200 is shown in FIG. 6. A central monitoring unit 370 is provided in order to receive a report from the guard host device 350 about a current condition at the transit 1; 1' as detected by the guard sensor device 100; 200 and communicated 140; 240 to the guard host device 50, as previously described. It is recalled that the condition detected by the guard sensor device 100; 200 is indicative of whether the installation of the cables, pipes or wires in the transit is sealed or at least potentially not sealed, i.e. whether the sealed condition of the transit installation has possibly been compromised.

The central monitoring unit 370 may, for instance, be implemented as a server computer, workstation computer, personal computer or laptop computer, having an operating system and being appropriately programmed to perform the functionalities described herein, or as a cluster of such computer devices, or as a cloud computing service.

As seen at 361, the central monitoring unit 370 and the guard host device 350 are operably connected by one or more communication network(s) 360, which may be mobile telecommunication network(s) (compliant with any commercially available mobile telecommunication standard, for instance (without limitation) GSM, UMTS, LTE, D-AMPS, CDMA2000, FOMA and TD-SCDMA), wide area data network(s) (such as an IP based data network in the form of the Internet or a part thereof), local area network(s) (such as a WiFi/WLAN, Bluetooth or LAN network), industrial data bus(es) (such as ASI, CANbus, ProfiBus or Modbus), or any combination thereof. In some embodiments of the monitoring system 300, the guard host device 350 connects to a local area networks via a wireless link, whereas the central monitoring unit 370 connects to a wide area network, to which the local area network is connected with in turn.

The guard host device 350 is an implementation of the guard host device 50 previously disclosed and described. It comprises a controller 351 which takes care of the overall operation of the guard host device 350. The controller 351 of the guard host device 350 may, for instance, be implemented as a central processing units (CPU), digital signal processor (DSP), application-specific integrated circuit (ASIC), field-programmable gate array (FPGA), or generally by any electronic circuitry capable of performing the functionalities as described herein.

The guard host device 350 also comprises a sensor interface 352 for receiving the alert signal S as communicated 140; 240 from the guard sensor device 100; 200. As the skilled person will understand, the sensor interface 352 may be a serial electrical interface for embodiments of the guard sensor device 100; 200 that operate by cable-based communication 140; 240, or a wireless communication interface for embodiments that operate wirelessly. Such a wireless communication interface may, for instance, be implemented as IEEE 802.11, IEEE 802.15, ZigBee, WirelessHART, WiFi, Bluetooth, WCDMA, HSPA, GSM, UTRAN, UMTS, LTE, ASI, CANbus, ProfiBus or Modbus.

The guard host device 350 further comprises a memory 353, a battery 355 or other power source, and a communication interface 356 to the communication network 360. The memory 353 may, for instance, be implemented in any commonly known technology for electronic memories, such as ROM, RAM, SRAM, DRAM, CMOS, FLASH, DDR or SDRAM.

The guard host device 350 moreover comprises a status indicator unit 390. The status indicator unit 390 comprises one or more LED indicators 392, and/or a display screen 394, and/or a short-range wireless communication interface 396. The status indicator unit 390 may be used for providing a local status indication at the transit 1' to indicate that the sealed condition of the transit installation has possibly been compromised in response to the alert signal S being received from the guard sensor device 100; 200, or to indicate that no such alert signal S has been received and the sealed condition is accordingly good. Additionally or alternatively, the status indicator unit 390 may be used for indicating information that has been communicated from the central monitoring unit 370 to the guard host device 350, possible in response to having received a report from the latter about the receiving of the alert signal S.

FIG. 7 is a flowchart diagram illustrating a method 400 of guarding a cable, pipe or wire transit 1; 1' of a type that has one or more compressible transit elements 20; 25 for allowing a sealed installation of one or more cables 2, pipes or wires according to the present invention.

The method comprises a first step 410 of actuating one or more tightening members 41; 41' to an extent appropriate for obtaining the sealed installation.

Then, a second step 420 of the method 400 comprises applying a base part 110; 210 of a guard sensor device 100; 200 onto a protruding part of one tightening member 41a, 41a' of the one or more tightening members 41; 41'.

A third step 430 of the method 400 comprises mounting a cover part 120; 220 onto the base part 110; 210 by means of a mechanical connection (in the disclosed embodiment a snap lock connection) 114a-b, 124a-b; 214a-b; 224a-b, thereby forming between them an internal cavity 116a-b, 126a-b; 216, 226 for housing the protruding part of said one tightening member 41a; 41a' when having being appropriately actuated (i.e. having been mounted to the transit 1; 1' and tightened to an appropriate extent; please note that this actuation, as such, has occurred already in the prior step 410).

A fourth step 440 of the method 400 comprises detecting, by a sensor 130; 230 disposed in either of the base and cover parts 110, 120; 210, 220, removal of the cover part 120; 220 with respect to the base part 110; 210.

Finally, the method 400 comprises a fifth step 450 of generating, in response to the detection in step 440, an alert signal S to indicate that the sealed condition of the installation has possibly been compromised.

The invention has been described above in detail with reference to embodiments thereof. However, as is readily understood by those skilled in the art, other embodiments are equally possible within the scope of the present invention, as defined by the appended claims.

The invention claimed is:

1. A guard sensor device for use with a cable, pipe or wire transit of a type that has one or more compressible transit elements for allowing a sealed installation of one or more cables, pipes or wires, said sealed installation requiring appropriate mounting and tightening of one or more tightening members, the guard sensor device comprising:

a base part, the base part being configured to extend adjacent a first side of a stem of one of said one or more tightening members once said one of said one or more tightening members has been actuated to an extent appropriate for obtaining said sealed installation;

a cover part, the cover part being configured to extend adjacent a second side of the stem of said one of said one or more tightening members, wherein the first side of the stem is opposite the second side of the stem, and the cover part being mountable onto the base part by means of a mechanical connection, thereby forming between said base part and said cover part an internal cavity for housing the stem of said one of said one or more tightening members after having been appropriately actuated; and a sensor disposed in either of said base part and said cover part, and being adapted to detect removal of the cover part with respect to the base part and in response generate an alert signal to indicate that the sealed condition of said installation has possibly been compromised.

2. The guard sensor device as defined in claim 1, wherein the mechanical connection is a snap lock connection for engaging the cover part with the base part.

3. The guard sensor device as defined in claim 2, wherein the snap lock connection is formed by a pair of resilient locking tongues on one of the cover part and the base part and by a pair of corresponding engagement structures in the other of the base part and the cover part, the corresponding engagement structures being adapted for engaging with the resilient locking tongues when the cover part is mounted onto the base part with the stem of said one of said one or more tightening members being received in the internal cavity formed between the base part and the cover part.

4. The guard sensor device as defined in claim 1, further comprising:
  means for communicating the alert signal to a guard host device.

5. The guard sensor device as defined in claim 4, wherein the means for communicating the alert signal to the guard host device comprises:
  a signal cable being mechanically coupled to at one end to the base part and being operatively connected to said sensor; and
  a cable connector at another end of the signal cable for connecting the signal cable to the guard host device.

6. The guard sensor device as defined in claim 4, wherein the means for communicating the alert signal to the guard host device comprises a wireless communication interface.

7. The guard sensor device as defined in claim 1, further comprising an elongated stiff support member coupled at one end to the base part and at another end adapted to be coupled to a housing of the guard host device.

8. The guard sensor device as defined in claim 1, the sensor being susceptive of a magnetic field and being provided in one of said base and cover parts, the guard sensor device further comprising a magnetic element which is a source of said magnetic field and is provided in the other of said base and cover parts.

9. The guard sensor device as defined in claim 1, wherein the sensor is selected from the group consisting of:
  a pressure sensor;
  a piezoelectric sensor;
  an electric switch; and
  a photo sensor.

10. The guard sensor device as defined in claim 1, wherein said tightening members are selected from the group consisting of:
  screws;
  bolts;
  pin bolts; and
  nuts.

11. The guard sensor device as defined in claim 1, wherein the internal cavity is formed by one or more recesses in the base part and one or more recesses in the cover part.

12. The guard sensor device as defined in claim 11, wherein each of the base part and the cover part comprises a first recess and a second recess for forming the internal cavity, the first recesses being shaped and dimensioned for receiving the stem of said one tightening member, and the second recesses being shaped and dimensioned for receiving a head extending from the stem of said one of said more or more tightening members.

13. The guard sensor device as defined in claim 12, wherein said one of said one or more tightening members is a screw or a bolt with a nut, wherein the first recesses are shaped and dimensioned for receiving a freely exposed part of the stem of the screw or bolt and the second recesses are shaped and dimensioned for receiving a head of the screw or the nut.

14. The guard sensor device as defined in claim 11, wherein each of the base part and the cover part comprises a recess for forming the internal cavity, the recesses being shaped and dimensioned for receiving the stem of said one of said one or more tightening members, and wherein each of the base part and the cover part further comprises a respective lateral edge portion, the lateral edge portions together defining an opening that matches a groove in a spacer element disposed on the stem of said one of said one or more tightening members.

15. The guard sensor device as defined in claim 1, wherein the base part and the cover part are shaped and designed to be mounted onto a pair of said tightening members of a compression unit in a transit that further has a rectangular frame for containing a plurality of compressible modules.

16. The guard sensor device as defined in of claim 1, wherein the base part and the cover part are shaped and designed to be mounted onto said one of said one or more tightening members of a compression unit in the transit that further has a cylindrical compressible body being axially compressible by actuating a plurality of said one or more tightening members, said plurality of said one or more tightening members including said one of said one or more tightening members.

17. A method of guarding a cable, pipe or wire transit of a type that has one or more compressible transit elements for allowing a sealed installation of one or more cables, pipes or wires, the method comprising:
  actuating one or more tightening members to an extent appropriate for obtaining said sealed installation;
  after said actuating of said one or more tightening members to said extent appropriate for obtaining said sealed installation:
    applying a base part of a guard sensor device onto a stem of said one of said one or more tightening members, the base part extending adjacent a first side of the stem of said one of said one or more tightening members, and
    mounting a cover part onto the base part by means of a mechanical connection, thereby forming between them an internal cavity for housing the protruding part of said one tightening members after having been appropriately actuated, wherein the cover part extends adjacent a second side of said one of said one or more tightening members, and wherein the first side of the stem is opposite the second side of the stem;
  detecting, by a sensor disposed in either of said base and cover parts, removal of the cover part with respect to the base part; and
  in response generating an alert signal to indicate that the sealed condition of said installation has possibly been compromised.

18. The method as defined in claim 17, further comprising:
  engaging the cover part with the base part by means of the mechanical connection in the form of a snap lock connection.

19. The method as defined in claim 17, further comprising:
  communicating the alert signal to a guard host device.

* * * * *